United States Patent
Stannard et al.

(10) Patent No.: US 9,476,653 B2
(45) Date of Patent: Oct. 25, 2016

(54) SYSTEM AND METHOD FOR STORING THERMAL ENERGY AS AUXILIARY POWER IN A VEHICLE

(71) Applicant: ENERMOTION INC., Bolton (CA)

(72) Inventors: John Hamilton Stannard, Kitchener (CA); David Robert Gibbs, Aurora (CA); Christopher Bachalo, Dunrobin (CA)

(73) Assignee: Enermotion Inc., Bolton (CA)

( * ) Notice: Subject to any disclaimer, the term of this patent is extended or adjusted under 35 U.S.C. 154(b) by 0 days.

(21) Appl. No.: 14/601,723

(22) Filed: Jan. 21, 2015

(65) Prior Publication Data
US 2015/0135740 A1    May 21, 2015

Related U.S. Application Data

(62) Division of application No. 13/395,049, filed as application No. PCT/CA2011/000315 on Mar. 30, 2011, now Pat. No. 8,966,914.

(60) Provisional application No. 61/319,923, filed on Apr. 1, 2010.

(51) Int. Cl.
*F28D 21/00* (2006.01)
*F28D 20/00* (2006.01)
(Continued)

(52) U.S. Cl.
CPC .............. *F28D 21/0003* (2013.01); *B60H 1/20* (2013.01); *B60H 1/3201* (2013.01); *F28D 7/106* (2013.01); *F28D 20/0034* (2013.01); *F28F 1/30* (2013.01); *Y02E 60/142* (2013.01)

(58) Field of Classification Search
CPC ....... B60H 1/3201; B60H 1/20; F28D 7/106; F28D 20/0034; F28D 21/0003; F28F 1/30; Y02E 60/142

USPC .............................................. 62/79, 177, 189
See application file for complete search history.

(56) References Cited

U.S. PATENT DOCUMENTS

| 2,783,622 A | 3/1957 | Bourassa |
| 2,995,890 A * | 8/1961 | Dolza ..................... F01L 13/04 |
| | | 123/179.16 |

(Continued)

FOREIGN PATENT DOCUMENTS

| DE | 10 2006 039347 A1 | 3/2008 |
| JP | 2000289451 A | 10/2000 |

(Continued)

OTHER PUBLICATIONS

European Patent Office, Extended European Search Report dated Jul. 11, 2014 issued in corresponding European Patent Application No. 11761855.3, 6 pages.
(Continued)

*Primary Examiner* — Mohammad M Ali
(74) *Attorney, Agent, or Firm* — Norton Rose Fulbright Canada LLP

(57) ABSTRACT

There is provided a controller for a heat capture and storage system configured to capture and store energy from heat expelled in engine exhaust. The controller includes a plurality of inputs, a plurality of outputs, and at least one processor coupled to a memory for storing within the memory instructions executable by the at least one processor. The controller is configured by execution of the instructions stored in the memory to: receive signals at one or more of the plurality of inputs, the signals representing at least one operating parameter of the heat capture and storage system; and based on at least one operating parameter, generate signals at one or more of the plurality of outputs for controlling at least one component of the heat capture and storage system to capture and store the energy from the heat expelled in the engine exhaust.

25 Claims, 7 Drawing Sheets

(51) Int. Cl.
*B60H 1/20* (2006.01)
*B60H 1/32* (2006.01)
*F28D 7/10* (2006.01)
*F28F 1/30* (2006.01)

(56) References Cited

U.S. PATENT DOCUMENTS

| | | |
|---|---|---|
| 4,380,909 A | 4/1983 | Sung |
| 4,542,629 A | 9/1985 | Biermann |
| 4,593,538 A | 6/1986 | Borde et al. |
| 4,606,005 A * | 8/1986 | Ribbens ............... B60W 10/06 701/99 |
| 4,716,874 A * | 1/1988 | Hilliard ................. F02P 5/1516 123/406.14 |
| 4,914,924 A | 4/1990 | Takahashi |
| 5,056,326 A | 10/1991 | Ohkumo et al. |
| 5,231,849 A | 8/1993 | Rosenblatt |
| 5,490,393 A | 2/1996 | Fuesting et al. |
| 5,572,885 A | 11/1996 | Erickson |
| 5,653,117 A | 8/1997 | Kujak |
| 5,704,417 A | 1/1998 | Christensen et al. |
| 5,761,925 A | 6/1998 | Maeda |
| 5,846,450 A | 12/1998 | Atkinson |
| 6,539,738 B2 | 4/2003 | Gonzalez-Cruz et al. |
| 6,564,573 B2 | 5/2003 | Pai et al. |
| 6,651,623 B1 * | 11/2003 | Tang ................. B01D 53/9495 123/406.23 |
| 6,779,337 B2 * | 8/2004 | Tang ..................... F01N 3/0842 123/3 |
| 7,406,822 B2 * | 8/2008 | Funke .................... F01N 3/025 60/297 |
| 7,582,224 B2 | 9/2009 | Artsiely |
| 2003/0037776 A1 | 2/2003 | Ban et al. |
| 2004/0055281 A1 * | 3/2004 | Tang ..................... F01N 3/0842 60/278 |
| 2004/0237512 A1 * | 12/2004 | Tang ..................... F01N 3/0842 60/295 |
| 2006/0130463 A1 * | 6/2006 | Miura ....................... F01N 3/22 60/289 |
| 2007/0017666 A1 * | 1/2007 | Goenka .................. B60H 1/004 165/202 |
| 2007/0271903 A1 * | 11/2007 | Rhodes ................... F01N 11/00 60/278 |
| 2008/0265684 A1 * | 10/2008 | Farkas .................. B60L 11/005 307/104 |
| 2010/0132384 A1 | 6/2010 | Shiflett et al. |
| 2010/0154419 A1 | 6/2010 | Kontomaris |

FOREIGN PATENT DOCUMENTS

| | | |
|---|---|---|
| JP | 2000289751 A | 10/2000 |
| WO | 2009/109036 A1 | 9/2009 |

OTHER PUBLICATIONS

DE 10 2006 039 347 (A1)—Machine Translation.
English Abstract of JP 2000289451.
English Abstract of JP 2000289751.
State Intellectual Property Office of P.R.C., First Office Action dated Aug. 5, 2014, issued in Chinese Patent Application No. 201180024006.7, together with an English Translation thereof.
Australian Government, IP Australia, Patent Examination Report No. 1, dated Jul. 2, 2014, issued in Australian Patent Application No. 2011235567.
International Bureau of WIPO, International Search Report and Written Opinion of the International Searching Authority dated Aug. 4, 2011, issued in International Application No. PCT/CA2011/000315.
International Bureau of WIPO, International Preliminary Report on Patentability dated Oct. 11, 2012, issued in International Application No. PCT/CA2011/000315; 9 pages.
IP Australia, Patent Examination Report No. 1 dated Mar. 29, 2016 issued on Application No. 2015200817.
Chinese Patent Office, First Office Action, dated May 31, 2016 issued on Application No. 2015100548877.

* cited by examiner

SYSTEM AND METHOD FOR STORING THERMAL ENERGY AS AUXILIARY POWER IN A VEHICLE

CROSS-REFERENCE TO RELATED APPLICATIONS

This application is a divisional of U.S. patent application Ser. No. 13/395,049, which is the National Stage of International Application No. PCT/CA2011/000315, filed Mar. 30, 2011, and claims the benefit of U.S. Provisional Patent Application No. 61/319,923, filed Apr. 1, 2010.

TECHNICAL FIELD

The present disclosure relates generally to energy storage, and more particularly to a system and method for capturing and storing thermal energy as a source of auxiliary power in a vehicle.

BACKGROUND

Conventional vehicles that use internal combustion engines, such as transport trucks, either require heat from a running engine to power a heating system of the vehicle to supply heat during the winter or require mechanical energy generated by a running engine to turn a compressor in order to power an air-conditioning system in order to supply cooling during the summer. Truck drivers often leave their engines running while the truck is parked for extended periods of time in order to supply this heating or cooling while taking a break or sleeping overnight. Since trucks typically have diesel engines, this prolonged idling results in significant amounts of pollutants being released into the atmosphere. Additionally, many jurisdictions are now implementing anti-idling legislation, which prohibits trucks from being left to idle and leaves the drivers with few options for heating or cooling while taking a break inside the cab.

It would be desirable to have a system and method for capturing and storing thermal energy as auxiliary power in a vehicle that addresses at least some of the shortcomings of the conventional systems.

SUMMARY

One aspect of the present disclosure provides a system for capturing energy from heat expelled in an exhaust of an engine of a motor vehicle and storing the captured energy. The system comprises a generator, a condenser, an evaporator, and an absorber. The generator captures heat from the exhaust of the engine and may be configured for circulating a first solution having a solute that is vaporizable by heat captured by the generator. The condenser may be coupled to the generator for receiving vaporized solute and condensing the vaporized solute to a liquid. The evaporator may be coupled to the condenser and have an orifice between the condenser and the evaporator, the evaporator having a first fluid passage for circulating the solute and a second fluid passage for circulating a second solution. The first and second fluid passages may be configured such that solute running through the first fluid passage is vaporizable by heat absorbed from the second solution running through the second fluid passage, thereby cooling the second solution. The absorber may be coupled to the evaporator and the generator. The absorber may be configured to return the solute to solution by mixing the solute with a solvent of the first solution supplied by the generator, and for returning the first solution to the generator to complete a cycle of the system.

Another aspect of the present disclosure provides a method for operating in cold storage mode a system for capturing energy from heat expelled in an exhaust of an engine of a motor vehicle and storing the captured energy. The method comprises absorbing heat from the engine exhaust into a solution and vaporizing a solute of the solution, leaving behind the solvent of the solution; cooling and condensing the solute back into a liquid; injecting the liquid solute into an evaporator, allowing the solute to absorb thermal energy, thereby cooling a second solution flowing through the evaporator; and further absorbing the solute back into the solvent to reconstitute the solution for further use in the absorbing step.

Another aspect of the present disclosure provides a method for operating in heat storage mode a system for capturing energy from heat expelled in an exhaust of an engine of a motor vehicle and storing the captured energy. The method comprises absorbing heat from the engine exhaust into a solution and vaporizing a solute of the solution, leaving behind a solvent of the solution; circulating the solute through an evaporator to enable the solute to dissipate thermal energy, thereby heating a second solution flowing through the evaporator; and absorbing the solute back into the solvent and reconstituting the solution for further use in the absorbing step.

Another aspect of the present disclosure provides a controller for controlling a system for capturing energy from heat expelled in an exhaust of an engine of a vehicle and storing the captured energy. The controller may have at least one processor coupled to a memory for storing within the memory instructions executable by the at least one processor and a plurality of inputs and a plurality of outputs. The controller may be configured to execute instructions stored in the memory and thereby receive signals at one or more of the inputs and generate signals at one or more of the outputs for controlling components of the system to capture energy from the heat expelled in the exhaust of the engine of the vehicle and store the captured energy.

Another aspect of the present disclosure provides a heat exchanger for use in a system for capturing energy from heat expelled in an exhaust of an engine of a vehicle and storing the captured energy. The heat exchanger may have an outer conduit and an inner conduit. The heat exchanger captures heat from the exhaust of the engine travelling through the inner conduit and transfers the heat to a solution circulating through the outer conduit, a solute of the solution being vaporized as heat is absorbed by the solution.

BRIEF DESCRIPTION OF THE DRAWINGS

Reference will now be made to the drawings, which show by way of example, embodiments of the present disclosure, and in which.

DETAILED DESCRIPTION

Figure 1:
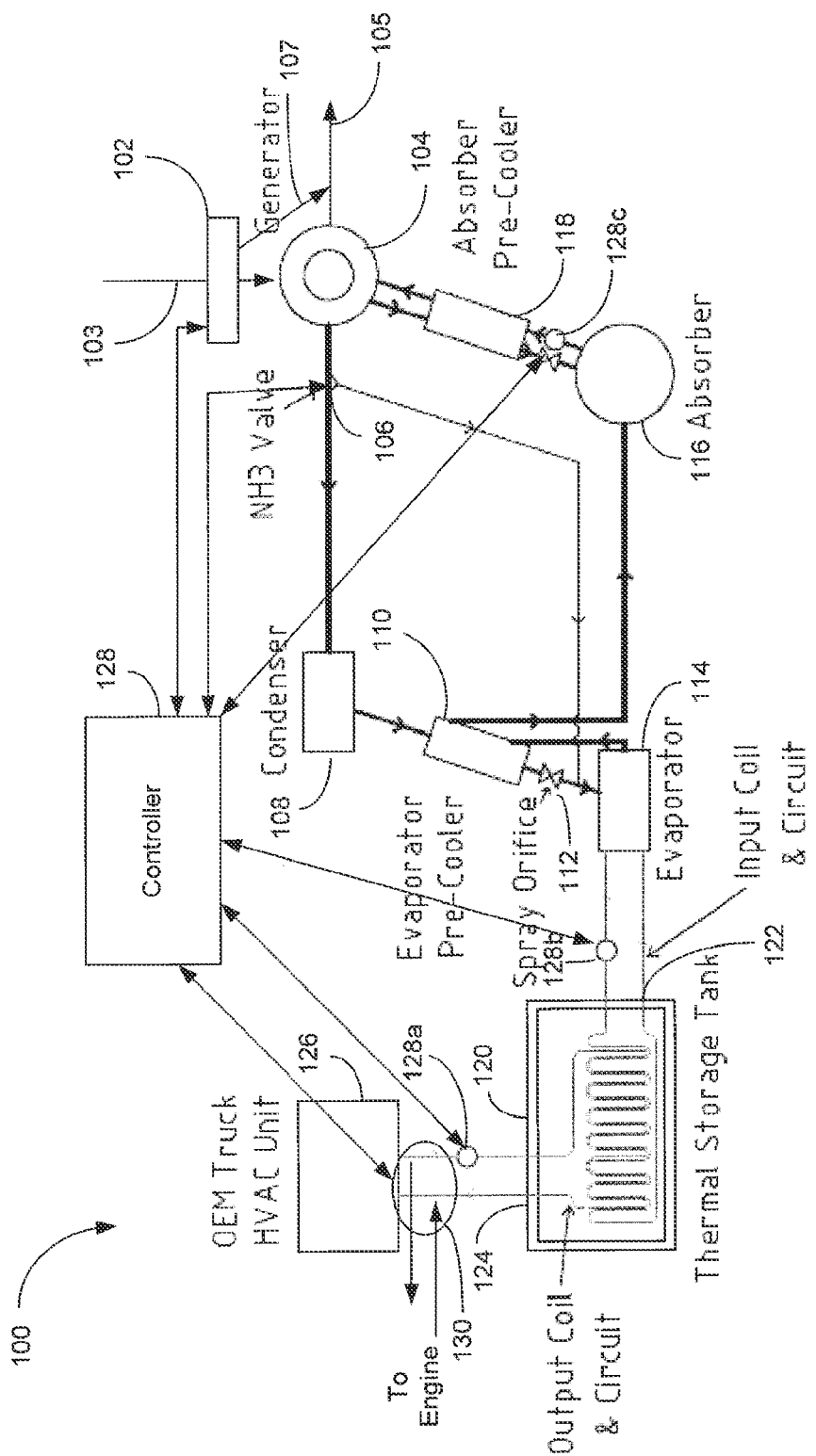
FIG. 1 shows in block diagram form a thermal auxiliary power unit according to one aspect of the present description.

Thermal auxiliary power unit systems are described that store and release thermal energy in a controlled manner to enable a vehicle such as a truck to continue to provide heating and cooling to the passenger compartment and/or to other systems within the vehicle when the main engine is not running. Such systems may thereby reduce fuel consumption, emissions, and make it easier for drivers to comply with existing and/or upcoming anti-idling legislation. During the winter months, heat may be captured from the engine's exhaust and/or engine cooling system and may be stored in an insulated tank for later use. During the summer months, the heat from the vehicle exhaust system may be used to drive an absorption refrigeration unit that cools a liquid and/or creates ice, which are stored. Some aspects of the functioning of the systems may be similar to a combined cycle used in power plants but are suitably modified and applied to a motor vehicle. The ice may be melted at a later time giving up its latent heat to provide a source of cooling. In neither case is any significant additional fuel used to create the heating or cooling storage, thus reducing fuel cost for the operator who wishes to have heating or cooling available at a time that would normally require leaving an engine idling while the vehicle is not being driven. The system may therefore make use of waste heat expelled by an internal combustion engine by capturing the waste heat in a bottoming cycle and storing it in an absorption cycle.

The term bottoming cycle is used herein to refer to the process of capturing energy from exhaust heat and the term absorption cycle is used herein to describe a style of refrigeration, which is a thermal process and not a mechanical process. For example, an absorption refrigerator is a refrigerator that uses a heat source to provide the energy needed to drive a cooling system.

Systems according to the invention may include an insulated storage vessel capable of storing up to, for example, 10 kWh of thermal energy, an absorption refrigeration unit, a battery to store sufficient electricity for pumping, air circulation and control purposes, and heat exchangers to acquire and dispense the thermal energy through an absorption cycle under the control of an energy management controller. One form of such systems may include a photo voltaic array that generates electricity during daylight hours for storage in the battery. Another form of such systems may simply utilize a high output mechanically-coupled alternator which charges the battery during vehicle use.

Systems in accordance with the invention may provide an advantage over conventional truck heating, ventilating, and air-conditioning (HVAC) systems that use some fuel during driving to power a cooling or heating system and that also use fuel in a direct fire heater during periods when the main engine is shut off. Other systems use a small auxiliary engine and present problems with noise and vibration, maintenance, and also use fuel and create additional emissions. Systems in accordance with the invention may also provide a life cycle cost that uses and stores thermal energy directly with little or no operational penalty to vehicle operation. Such systems may use little or no fuel and, in some embodiments, may even reduce fuel consumption while driving. In long haul trucks, the system may pay for itself in as little as two years due to reduced fuel consumption from reduced idling. The system itself may be emission free and silent or nearly silent in operation.

Referring now to FIG. 1, a block diagram is shown illustrating a thermal auxiliary power unit or system 100 according to one aspect of the present description. The system 100 generally includes an exhaust diverter valve 102, a generator 104, a valve 106, a condenser 108, an evaporator pre-cooler or heat exchanger 110, a spray orifice 112, an evaporator 114, an absorber 116, an absorber pre-cooler or heat exchanger 118, a thermal storage tank 120, a thermal tank input coil and circuit 122, a thermal tank output coil and circuit 126, a controller 128, and a valve 130.

The exhaust diverter valve 102 may be coupled to an exhaust pipe of a vehicle and the generator 104 and the valve 102 may ensure the thermal energy from the engine exhaust is appropriate for the system 100 by regulating the flow of exhaust to the generator 104. In FIG. 1, the exhaust arriving from the engine to the system 100 is indicated by arrow 103 and the exhaust leaving the system 100 after passing through the generator 104 is indicated by arrow 105. A bypass path controllable by the valve 102 is indicated by arrow 107. In one example, the valve 102 may be a 3-way, 2-position type valve and may be able to completely divert the exhaust to or away from the generator 104 or blend between the generator 104 and bypass path 107 to achieve the proper heat load passing through the generator 104. Optionally, the valve 102 may be omitted, but this may compromise performance on different driving cycles The generator 104 may include a heat exchanger that receives the hot exhaust from the engine and captures heat expelled in the exhaust from the engine of the vehicle and transfers that energy to a solution (e.g., water/ammonia ($H_2O/NH_3$)) that circulates through the generator 104. The solution may be heated to a point where the solute (e.g., the ammonia) boils out of the water sending the ammonia at a high pressure and temperature out through a line to the next component in the system (e.g., either the condenser 108 in cooling mode or the evaporator 114 in heating mode). In one example, the heat exchanger component of the generator 104 may be the liquid to air type and may capture the heat from the exhaust of the vehicle engine. However, a liquid to liquid heat exchanger may also perform the same task and recover the thermal energy from other heat sources of the engine such as the cooling circuit of the engine. While the generator 104 is referred to throughout as a generator, the term heat exchanger is equally applicable and the generator 104 may accurately be referred to as a heat exchanger. The generator 104 is described in more detail below in connection with FIG. 5.

The valve 106 may provide the system 100 with the ability to switch between heating and cooling mode by changing the fluid flow path through the system 100. For example, the valve 106 may be of the 3-way 2-position type and may direct the flow of ammonia through the condenser 108 prior to the spray orifice 112 and evaporator 114 and the system 100 may function using an absorption cycle when cooling is desired. If heating is desired, the valve 106 may be configured to direct the flow of ammonia through a secondary circuit bypassing the condenser 108 and the spray orifice 112, which eliminates the cooling portion of the system 100 and sends hot ammonia directly to the evaporator 114. The heating and cooling modes of the system 100 will be described in greater detail below in connections with FIGS. 2 and 3.

The condenser 108 may include a heat exchanger that condenses the hot ammonia gas back into a liquid while still under high pressure by cooling the ammonia below its boiling point while the system 100 is operating in cooling mode. In one embodiment, the heat exchanger portion of the condenser 108 may be of the liquid to air type and may remove thermal energy from the ammonia and releases it to the surrounding environment. It is also possible to implement the condenser 108 as the liquid to liquid type and discard the excess thermal energy elsewhere to a liquid, however this could lower the coefficient of performance of the condenser 108. The condenser 108 may optionally have a fan (not shown) configured to pass air through the condenser 108 thereby increasing the efficiency of the condenser 108.

The evaporator pre-cooler 110 may include a heat exchanger and aims to increase the coefficient of performance of the system 100, therefore allowing other components to operate more efficiently. In one embodiment, the heat exchanger portion of the evaporator pre-cooler 110 is of the liquid to liquid type and transfers thermal energy between a fluid passage going from the condenser 108 to the evaporator 114 and from a fluid passage going between the evaporator 114 and the absorber 116. In one example, the fluid passages may be implemented using fluid coils within the exchanger portion of the evaporator pre-cooler 110. It is also possible to omit the evaporator pre-cooler 110 from the system 100, but performance may be reduced.

The spray orifice 112 may include a restriction placed in the flow passage in the cooling circuit. As the ammonia leaves the evaporator pre-cooler 110 before the ammonia arrives at the evaporator 114, the orifice 112 causes the high pressure ammonia to be sprayed into the relatively low pressure cavity of the evaporator 114, resulting in the ammonia being vaporized. The loss in pressure of the ammonia also causes a temperature drop of the ammonia.

The evaporator 114 includes a heat exchanger for transferring thermal energy between the absorption system containing the ammonia and a circuit that transfers that thermal energy to the thermal storage tank 120. In one embodiment, the heat exchanger portion of the evaporator 114 is of the gas to liquid type with the ammonia flowing through a first fluid passage (e.g., a fluid coil) of the evaporator 114 and solution (e.g., glycol/water) flowing through a second fluid passage (e.g., a fluid coil) of the evaporator 114.

The absorber 116 includes a heat exchanger that allows the ammonia solute to dissolve back into the water solvent by cooling both fluids to a temperature where such can occur. The absorber 116 may include a spray bar at its lower end. The ammonia is fed through the spray bar and since ammonia is lighter than water, the ammonia bubbles through the water to the top and is largely absorbed in the water. In one embodiment, the heat exchanger portion of the absorber 116 is of the liquid to air type. It is also possible to use a liquid to liquid type heat exchanger in the absorber 116 at a lower overall system performance.

The absorber pre-cooler 118 may include a heat exchanger for increasing the coefficient of performance of the system 100 and therefore allowing other components to operate more efficiently. In one embodiment, the heat exchanger portion of the absorber pre-cooler 118 is of the liquid to liquid type and transfers thermal energy between the ammonia/water fluid passage connected between the absorber 116 and the generator 104 and the return water fluid passage going back from the generator 102 to the absorber 116; however it may be possible to create a system that would operate without the pre-cooler 118 be it at a lower coefficient of performance.

The thermal storage tank 120 may be, for example, a sealed storage tank that houses and insulates thermal storage fluid and the thermal energy the fluid stores until that energy is needed for transfer elsewhere at a later time. In one example, the thermal storage fluid may be a water/glycol blend. The thermal storage tank 120 may include an input fluid passage 122 (e.g., a fluid coil and circuit) and an output fluid passage 124 (e.g., a fluid coil and circuit).

The input fluid passage 122 may form part of a heat exchanger and may have a corresponding fluid circuit and pump for transferring thermal energy from the evaporator 114 to the thermal storage tank 120, or vice versa. In one example, the heat exchanger portion of the input fluid passage 122 may be of the liquid to liquid type with, for example, a glycol/water blend used for the fluid in the fluid passage 122 flowing back and forth from the evaporator 114 to the thermal storage tank 120. The thermal storage tank 120 may have fluid present within the thermal storage tank 120 in which the input fluid passage 122 is submerged. In one example, the fluids of the fluid passage 122 and the thermal storage tank 120 are of different concentrations to achieve different effects. However, any glycol concentration in the water may be used to meet the design criteria of a particular application.

The thermal tank output fluid passage 124 may form part of the heat exchanger and the fluid passage 124 may be driven by a pump and may be responsible for transferring thermal energy from the thermal storage tank 120 to the HVAC 126 unit of a vehicle. In one example, the heat exchanger portion of the thermal tank having output fluid passage 124 and input fluid passage 122 may be of the liquid to liquid type with, for example, a glycol/water blend being both the fluid in the fluid passage 124 and the thermal storage fluid present within the thermal tank 120 in which the thermal tank fluid passage 124 is submerged. In one example, the fluids of the tank output fluid passage 124 and the thermal storage tank 120 are of different concentrations to achieve different effects. However, any glycol concentration in the water may be used to meet the design criteria of a particular application.

The valve 130 may be, in one example, a 3-way 3-position dual circuit type valve and may direct the flow of the solution (e.g., glycol/water) between the vehicle's HVAC 126, the vehicle's engine, and the thermal storage tank 120. For example, if the solution in the thermal storage tank 120 is hot because the vehicle is currently being operated in a cold environment such as during the winter, the valve 130 may control three possible operating modes. First, the valve 130 may be closed, connecting the engine to the HVAC unit 126, for example when the vehicle is moving and the heat source from the thermal storage tank is currently not needed while the system 100 is heating the solution in the thermal storage tank 120 for later use. Second, the valve may be in a first open position allowing the solution to pass from the thermal storage tank 120 to the HVAC unit 126, thereby allowing the HVAC 126 to use the stored heat such as when the vehicle is parked with the engine off and a user of the system 100 desires the cabin of the vehicle to be heated. Third, the valve may be in a second open position directing the flow of solution to the vehicle engine. This may be useful during a cold start of the engine during cold conditions, allowing the user of the system 100 to pre-heat the engine before starting the engine, thereby reducing engine wear and emissions emitted by the engine during a cold start and allowing the user to immediately use the vehicle heating system once the engine is started.

The system 100 further includes a controller 128 programmed with suitable code for controlling the overall operation of the system 100. The controller 128 generally includes a processor coupled to a memory for storing and/or executing program code stored in the memory and a number of inputs and outputs for communicating with various parts of the system 100. While interconnections between the components of the system 100 and the controller 128 are shown in FIG. 1 in limited detail, outputs of the controller 128 may be electrically connected to any part of the system 100 controlled by the controller 128 and inputs of the controller 128 are electrically connected to any suitable or desired transducers, feedback loops, or other components of the system 100 responsible for supplying input signals to the controller 128.

Pumps may also be used in the system 100 where gases or fluids need help flowing in a particular direction, for example where pressure gradients do not automatically cause fluid flow to occur in a desired direction. Pumps may be suitably implemented anywhere, according to the design criteria of a particular application. As an example, pump 128a is shown aiding the flow of the water/glycol blend in the output fluid passage 124, pump 128b is shown aiding the flow of the water/glycol blend in the input fluid passage 122, and pump 128c is shown aiding the flow of the water/ammonia blend from the absorber 116 towards the higher pressure portion of the system 100 where the absorber pre-cooler 118 and generator 104 reside.

The system 100 may also have a battery (not shown) to store sufficient electricity for pumping, air circulation (e.g., fans) and/or control purposes. Optionally, the system 100 may have a photovoltaic array that generates electricity during daylight hours for storage in the battery.

Figure 2A:
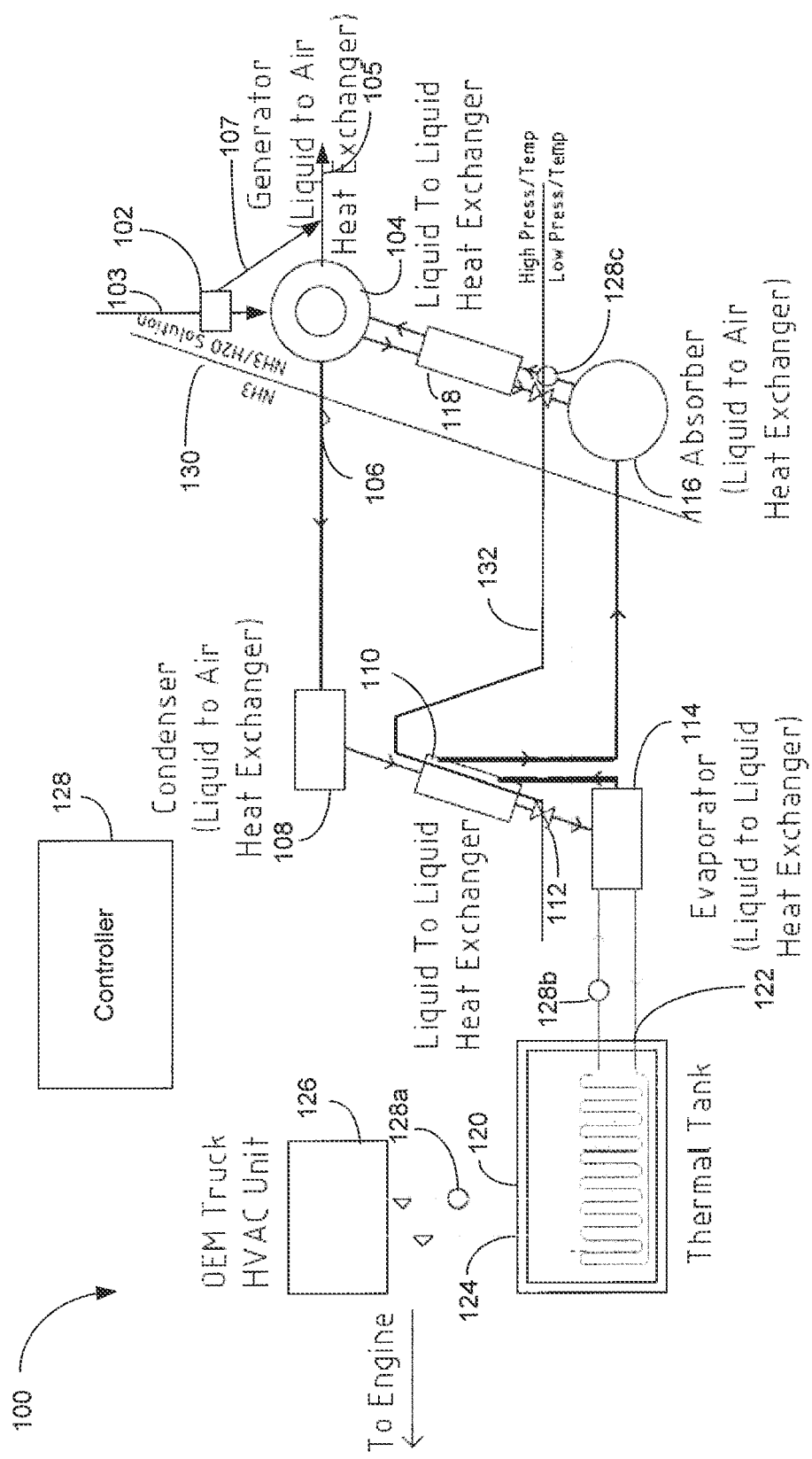
FIG. 2a shows in block diagram form a thermal auxiliary power unit operating in a cold storage mode according to one aspect of the present description.
Figure 2B:
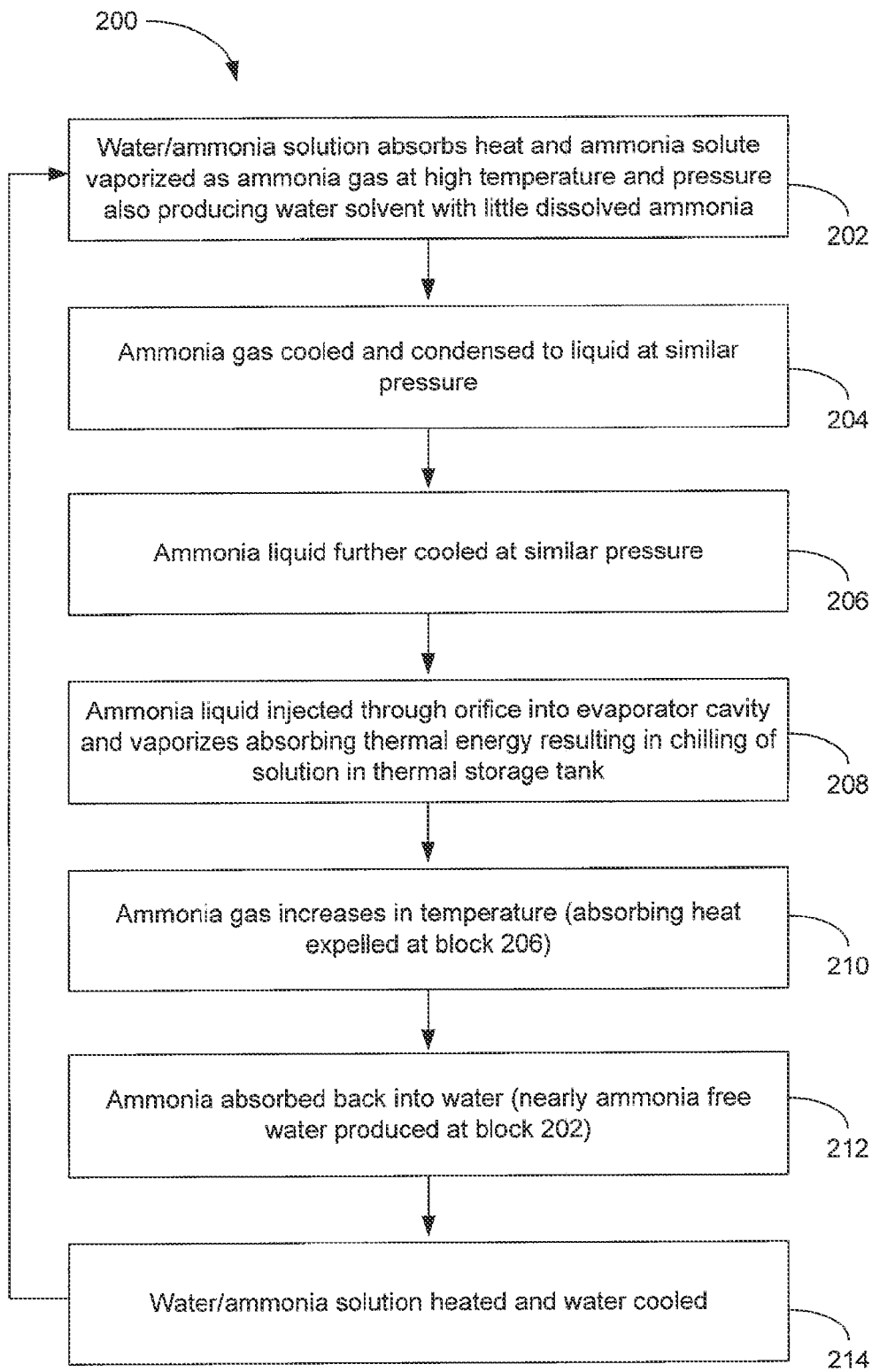
FIG. 2b shows in flow chart form the process of a thermal auxiliary power unit operating in a cold storage mode according to one aspect of the present description.

Referring now to FIGS. 2a and 2b, collectively referred to as FIG. 2, FIG. 2a shows in block diagram form a thermal auxiliary power unit or system 100 operating in a cold storage mode according to one aspect of the present description. In FIG. 2a, the line from the valve 106 to the evaporator 114 is greyed out illustrating that this path is not used when the system 100 operates in cold storage mode. FIG. 2b shows in flow chart form the process 200 of a thermal auxiliary power unit operating in a cold storage mode according to one aspect of the present description. At a first block 202, exhaust from an engine of a vehicle flows through the generator 104, as indicated by arrows 103 and 105, and the generator absorbs heat from the exhaust gas and transfers this heat to a solution, for example water with dissolved ammonia, being circulated through the heat exchanger portion of the generator 104. As a result, the solute (e.g., the ammonia) boils out of solution and is vaporized and ammonia gas progresses through valve 106, which is configured to direct the ammonia gas towards the condenser 108 while the system 100 operates in the cold storage mode. The solvent of the solution (e.g., water) is left behind at the generator 104. As an example, dividing line 130 illustrates the division between the portion of the system 100 where an ammonia/water solution is circulated (e.g., through the absorber 116, the absorber pre-cooler 118, and the generator 104) and the portion of the system 100 where substantially only ammonia is circulated (the valve 106, the condenser 108, the evaporator pre-cooler 110, the orifice 112, and the evaporator 114).

Further, exemplary test results provide an approximate indication of the temperatures and pressures that may be observed at various stages in the process 200 and in the system 100 when operating in a cooling mode. For example, typical exhaust gas from a diesel powered truck may enter the generator 104 at a temperature of about 400 degrees Celsius and may exit the generator 104 at a temperature of about 300 to 380 degrees Celsius, assuming the diverter valve 102 is not diverting any of the exhaust gas through the bypass path 107. Pressure in the heat exchanger portion of the generator 104 may reach about 120 to 250 psig, resulting in ammonia gas travelling towards the condenser 108 at a pressure of about 120-250 psig and a temperature of approximately 130 degrees Celsius. While specific examples and/or ranges of observed temperatures and/or pressures and provided here and further on in the description, these temperatures and pressures are dependent on the exact design and operating mode of the system 100 and may vary substantially depending on the desired design criteria and operating mode of the system 100. In other words, the examples of observed pressures and temperatures in the system 100 are provided as examples only and are not intended to be limiting. Further, while an ammonia/water solution is provided as an example as a suitable solvent/solute for operating the system 100, any suitable solvent/solute combination may be used, depending on the design criteria of a particular application.

Next at a block 204, the ammonia arriving at the condenser 108 is cooled and condensed into a liquid to surrender some of the heat carried by the ammonia gas. In a cooling mode of the system 100, it may be the pressure of the ammonia gas that is desired to act as an energy source at the evaporator 114, however the resulting high temperature assumed by the ammonia is not needed and the ammonia is therefore cooled before arriving at the evaporator 114. For example, the condenser 108 may cool the ammonia to approximately 50 to 60 degrees Celsius by transferring the heat to the surrounding air using a coil and fan design liquid to air heat exchanger. The ammonia may remain at 120-250 psig on exiting the condenser 108 and travelling towards the evaporator pre-cooler 110.

Next, at a block 206, the ammonia liquid is further cooled, for example in a first fluid passage (e.g., a fluid coil) at the evaporator pre-cooler 110. The heat exchanger portion of the evaporator pre-cooler 110 may be of the liquid to liquid type and transfers thermal energy between the first fluid passage going from the condenser 108 to the evaporator 114 (e.g., the first coil) and from the fluid passage going between the evaporator 114 and the absorber 116 (e.g., a second coil). The ammonia leaving the first coil of the evaporator pre-cooler 110 will be cooler than the ammonia liquid entering the second coil of the evaporator pre-cooler 110. For example, the ammonia liquid leaving the first coil of the evaporator pre-cooler 110 may be at a temperature of about 50 degrees Celsius and a pressure of about 120-250 psig.

Next, at a block 208, the ammonia gas passes through the spray orifice 112 and passes into or is injected into the evaporator 114. The orifice 112 creates a boundary between the high pressure side of the system 100 and the low pressure side of the system 100, illustrated by line 132. As the ammonia passes through the orifice 112 into the cavity of the evaporator 114 (e.g., through a first fluid passage of the evaporator 114), the ammonia vaporizes because the ammonia encounters an area of lower pressure, which also forces the temperature of the ammonia down significantly. In the process of vaporizing, the ammonia absorbs thermal energy through the heat exchanger portion of the evaporator 114 from the water/glycol mixture being circulated through a second fluid passage (e.g., a fluid coil) of the evaporator 114, thereby cooling the water/glycol mixture, which travels onwards to the thermal tank input fluid passage (e.g., a coil and circuit) 122. The ammonia that enters the evaporator 114 after passing through the orifice 112 may have a temperature of approximately −10 to −5 degrees Celsius and a pressure of approximately 0-5 psig. The ammonia gas that leaves the evaporator 114 and travels back to the evaporator pre-cooler 110 may have, for example, a temperature between −5 and 0 degrees Celsius and a pressure of approximately 40 to 55 psig.

Next, at a block 210, the ammonia gas passes again through the evaporator pre-cooler 110, this time through the second fluid passage and absorbs heat surrendered by the first fluid passage at block 206. The ammonia gas may leave the second coil of the evaporator pre-cooler 110 at temperature of about 10 degrees higher than on entering the second fluid passage of the evaporator pre-cooler 110, and the ammonia gas travels onwards through the low pressure side of the system 100 towards the absorber 116. Blocks 206 and 210 of the process 200 work in conjunction with each other since blocks 206 and 210 make use of the evaporator pre-cooler 110 and are optional and aim to increase performance of the system 100.

Next at a block 212, the ammonia is absorbed back into the water. The water that the ammonia absorbs into may be the nearly ammonia free water produced at the block 202 when the ammonia boils out of the ammonia/water solution. The ammonia gas travels through the absorber 116 that includes a heat exchanger that allows the ammonia gas to dissolve back into the water by cooling both fluids to a temperature where such can occur. The absorber 116 may include a spray bar at its lower end, which the ammonia is fed through where the ammonia bubbles to the top and is largely absorbed in the water. The water/ammonia solution may be pumped up to a higher pressure and temperature (e.g., across line 132 by pump 128c) and arrive next at the absorber pre-cooler 118.

Next at a block 214, the water/ammonia solution passes through the absorber pre-cooler 118. Block 214 that uses the absorber pre-cooler 118 may be an optional step in the process 200 that aims to increase the efficiency of the system 100 and the absorber pre-cooler 118 may be an optional feature of the system 100. Hence, the block 214 and the absorber pre-cooler 118 may not be needed for the functioning of the system 100. In embodiments that do use the pre-cooler 118, the water/ammonia solution travelling towards the generator 104 through a first fluid passage (e.g., a first coil) of the pre-cooler 118 absorbs heat while the water travelling from the generator 104 to the absorber 116 (e.g., water that has had the ammonia boiled out of solution) through a second fluid passage (e.g., a second coil) of the pre-cooler 118 is cooled to bring the water closer to the temperature where re-absorption of ammonia will occur at the absorber 116. The water/ammonia solution arriving at the generator 104 completes the cycle of the process 200 and the process 200 returns to the block 202.

Figure 3A:
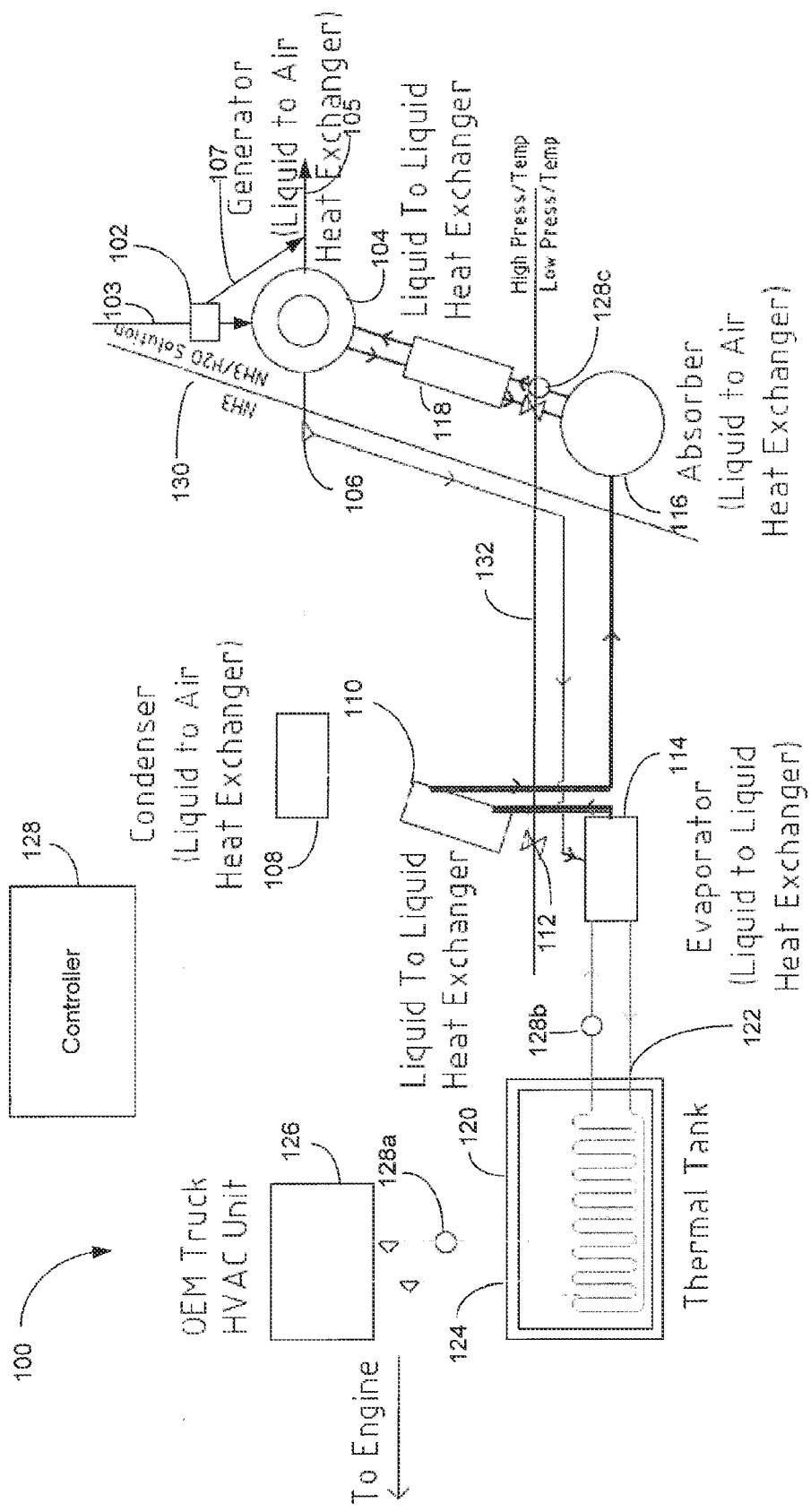
FIG. 3a shows in block diagram form a thermal auxiliary power unit operating in a heat storage mode according to one aspect of the present description.
Figure 3B:
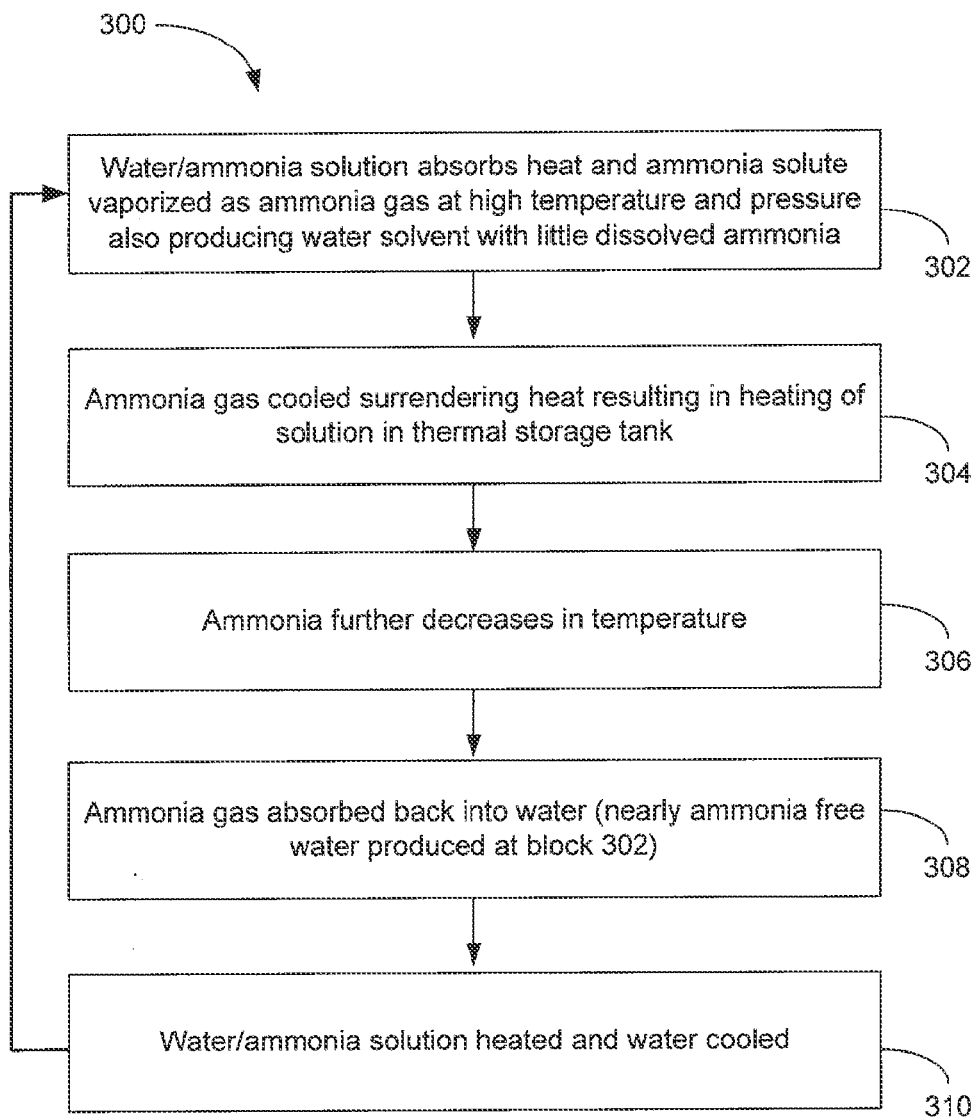
FIG. 3b shows in flow chart form the process of a thermal auxiliary power unit operating in a heat storage mode according to one aspect of the present description.

Referring now to FIGS. 3a and 3b, collectively referred to as FIG. 3, FIG. 3a shows in block diagram form a thermal auxiliary power unit or system 100 operating in a heat storage mode according to one aspect of the present description. In FIG. 3a, the path from the valve 106 to the condenser 108 to the pre-cooler 110 to the evaporator 114 is greyed out, illustrating that this path is not used when the system 100 operates in heat storage mode. FIG. 3b shows in flow chart form the process 300 of the thermal auxiliary power unit or system 100 operating in a heat storage mode according to one aspect of the present description.

At a first block 302, exhaust from an engine of a vehicle flows through the generator 104, as indicated by arrows 103 and 105, and the generator absorbs heat from the exhaust gas and transfers this heat to the ammonia/water solution being circulated through the heat exchanger portion of the generator 104. As a result, the ammonia is vaporized and boils out of solution and ammonia gas flows through valve 106, which in the present example is now configured to direct the ammonia gas directly towards the evaporator 114 while the system 100 operates in the heat storage mode. As an example, dividing line 130 illustrates the division between the portion of the system 100 where an ammonia/water solution is circulated (e.g., through the absorber 116, the absorber pre-cooler 118, and the generator 104) and the portion of the system 100 where substantially only ammonia is circulated (e.g., through the valve 106 and the evaporator 114). Water solvent is left behind and is directed towards the absorber pre-cooler 118. The low pressure/high pressure dividing line 132 shown in FIG. 3a should be ignored, as relatively little pressure differentials exist in the system 100 when operating in the heat storage mode as opposed to when operating as an absorption cycle.

Exemplary test results provide an approximate indication of the temperatures and pressures that may be observed at various stages in the process 300 and the in the system 100. For example, typical exhaust gas from a diesel powered truck may enter the generator 104 at a temperature of about 400 degrees Celsius and may exit the generator 104 at a temperature of about 300 to 380 degrees Celsius, assuming the diverter valve 102 is not diverting any of the exhaust gas through the bypass path 107. Pressure in the heat exchanger portion of the generator 104 may reach about 120-150 psig, resulting in ammonia gas travelling towards the evaporator 114 at a pressure of about 120-150 psig and a temperature of approximately 100 degrees Celsius. While specific examples and/or ranges of observed temperatures and/or pressures are provided here and further on in the description, these temperatures and pressures are dependent on the design and operating mode of the system 100 and may vary depending on the particular design criteria and operating mode of the system 100. In other words, the examples of observed pressures and temperatures in the system 100 are provided as examples only and are not intended to be limiting.

Next, at a block 304, the ammonia gas passes into a first fluid passage (e.g., a first coil) of a heat exchanger, for example in the evaporator 114, where the gas surrenders thermal energy and cools. In the process of cooling, the ammonia surrenders thermal energy through the heat exchanger portion of the evaporator 114 to the water/glycol mixture being circulated through a second fluid passage (e.g., a second coil) of the evaporator 114, thereby heating the water/glycol mixture, which travels onwards to the thermal tank input coil and circuit 122. The ammonia that enters the evaporator 114 may have a temperature of approximately 100 degrees Celsius and a pressure of approximately 120-250 psig.

Next, at a block 306, the ammonia gas passes through the evaporator pre-cooler 110. In a heat storage mode the flow of ammonia may bypass not only the orifice 112 on its way to the evaporator 114 but also the pre-cooler 110 so almost no heat transfer occurs at this point. In the process 300, the evaporator pre-cooler 110 may be used as a liquid to air heat exchanger, simply providing the function of cooling the ammonia gas to expel excess heat. The ammonia may leave the evaporator pre-cooler 110 at a temperature of about 10 degrees lower than upon entering the evaporator pre-cooler 110, and the ammonia gas travels onwards through the system 100 towards the absorber 116. The block 306 of the process 300 is optional, as is the direction of the ammonia through the evaporator pre-cooler shown in FIG. 4. Alternatively, the ammonia may proceed directly from the evaporator 114 to the absorber 116 when the system 100 operates in a heat storage mode.

Next at a block 308, the ammonia is absorbed back into the water of the ammonia/water solution. The water that the ammonia absorbs into may be the nearly ammonia free water produced at the block 302 when the ammonia is vaporized from the ammonia/water solution. The ammonia gas travels through the absorber 116 that includes a heat exchanger that allows the ammonia gas to dissolve back into the water by cooling both fluids (e.g., the ammonia and the water) to a suitable temperature where such can occur. The absorber 116 may include a spray bar at its lower end, which the ammonia is fed through where the ammonia bubbles through the water to the top and is largely absorbed in the water.

Next at a block 310, the water/ammonia solution passes through the absorber pre-cooler 118. Block 310 that uses the absorber pre-cooler 118 may be an optional step in the process 300 that aims to increase the efficiency of the system 100 and the absorber pre-cooler 118 may be an optional feature of the system 100. Hence, the block 310 and the absorber pre-cooler 118 may not be needed for the functioning of the system 100. In embodiments that do use the pre-cooler 118, the water/ammonia solution travelling towards the generator 104 through a first fluid passage (e.g., a first coil) of the pre-cooler 118 absorbs heat while the water travelling from the generator 104 to the absorber 116 (e.g., water that has had the ammonia vaporized out of solution) passes through a second fluid passage (e.g., a second coil) of the pre-cooler 118 is cooled to bring the water closer to the temperature where re-absorption of ammonia is best achieved at the absorber 116. The water/ammonia solution arriving at the generator 104 completes the cycle of the process 300 and the process 300 returns to the block 302.

Figure 4:
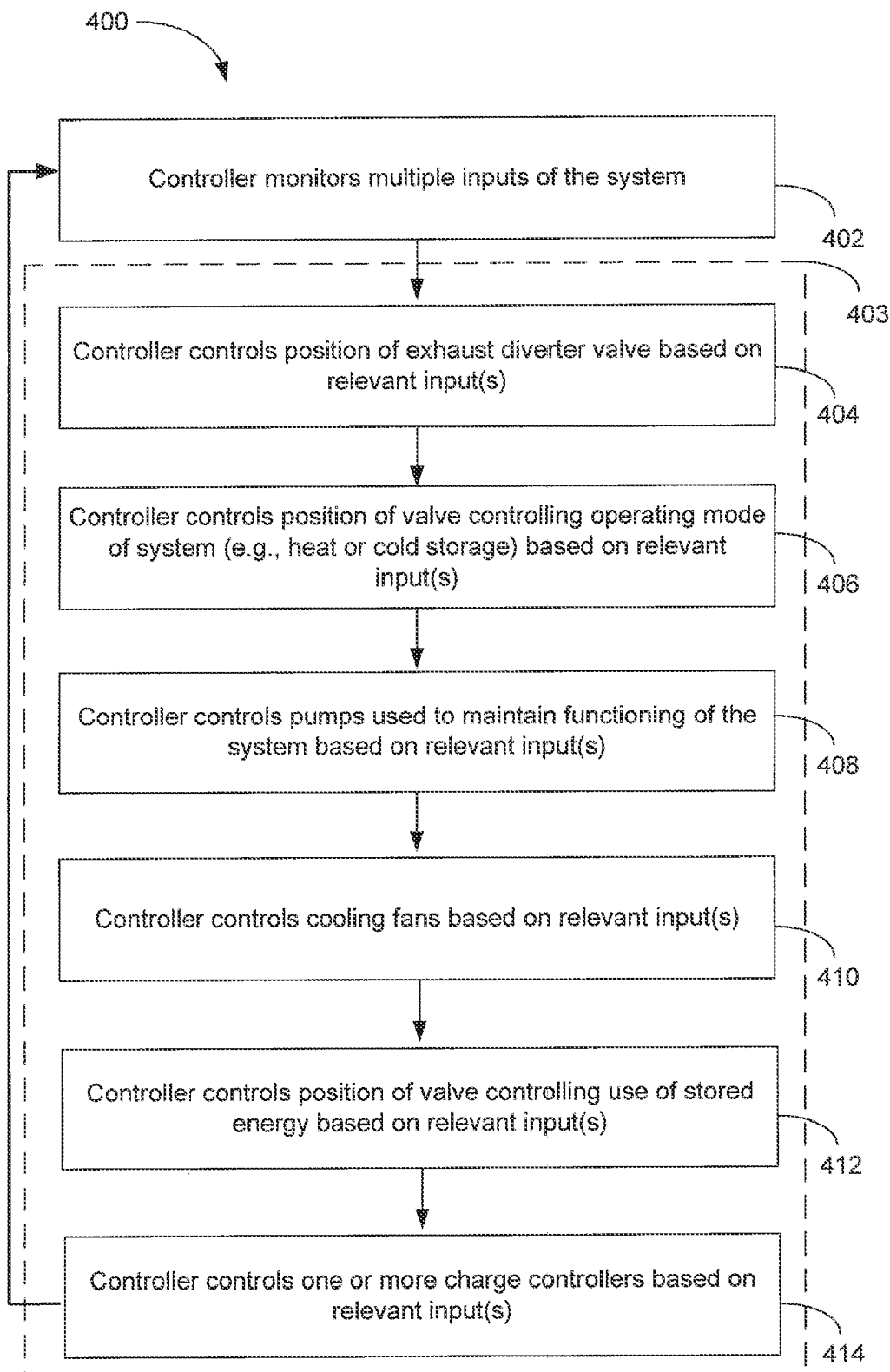
FIG. 4 shows in block diagram form a process executed by the controller of the thermal auxiliary power unit according to one aspect of the present description.

Reference is next made to FIG. 4, which illustrates in flow chart form a process 400 executed by the controller 128 in controlling the system 100. In one example, the controller 128 may be implemented as an electronic control module (ECU) designed to facilitate the desired operation of the system 100, also referred to as a Hybrid Auxiliary Power Unit (HAPU), by monitoring and controlling various aspects of the system 100 to achieve the function of providing heating and/or cooling to a vehicle and capturing and reusing what would otherwise be lost energy expelled as heat in the exhaust of the vehicle in an effort to reducing the overall carbon footprint of the vehicle. The controller 128 may be integral to the system 100 and may enable the system 100 to function according to the design criteria of the intended application. As shown in a first block 402, the controller may monitor and/or collect data pertaining to operating parameters of the system 100 and/or the vehicle on which the system 100 is installed including but not limited to pressure, temperature, voltage, liquid level, flow, and/or vehicle operator inputs. Using data collected from these inputs and processing the information using control logic, the controller 128 directs the actions of the components of the system 100 to maintain proper functioning of the system 100. The components of the system 100 that are either monitored or controlled by the controller 128 include but are not limited to valves, fans, actuators, relays, contactors, charge controllers, pumps and/or outputs. One possible use of the outputs maybe to illustrate aspects of the system operation to the user.

In one example, the controller 128 monitors aspects of the system 100 operation and allows the thermal cycle (e.g., illustrated in connection with FIGS. 2 and 3) and electrical system to function in harmony to provide conditioned air to the cab of the vehicle such as a truck. The controller 128 may be responsible for controlling several primary functions of the system 100, as described below. Generally, as indicated by block 403, the controller 128 controls a number of components of the system 100 coupled to outputs of the controller 128 to provide for proper functioning of the system 100.

The controller 128 may be electrically coupled to the exhaust diverter valve 102, which may be a 3-way 2-position valve configured by the controller 128 to ensure that the thermal energy delivered to the generator 104 from the exhaust is appropriate for the system 100 and divert the exhaust away from the generator 104 if the system 100 becomes too hot or is in danger of becoming too hot. As illustrated in block 404, the controller 128 controls the position of the exhaust diverter valve 102 according to relevant inputs received from, for example, transducers in the system 100. In one example, the valve 102 may completely divert the exhaust to or away from the generator 104 or blend the exhaust flow between the generator 104 and bypass path 107 to achieve the suitable heat delivery to the generator 104. In one example, the controller 128 monitors electrical signals from transducers indicating temperatures and/or pressures at various locations in the system 100 and generates a decision based on these signals according to control logic stored in the controller 128 and decides whether to increase or decrease the amount of thermal energy delivered to the generator 104 by comparing the signals the controller 128 receives from one or more of the input transducers against specific targets programmed into the control logic. The controller generates an output signal for the diverter valve 102 accordingly and operates the diverter valve 102 accordingly. If the controller 128 detects a fault based on one or more of the input signals, the controller 128 may generate an output signal to close the diverter valve 102 forcing all the thermal energy away from the generator 104 and through the bypass path 107 as part of a safety shutdown sequence.

The controller 128 may further be electrically coupled to valve 106, which may be a 3-way 2-position valve responsible for providing the system 100 with the ability to switch between a heating and cooling mode. As illustrated at block 406, the controller 128 controls the position of the valve 106 thereby selecting the operating mode of the system 100 based on relevant inputs. When cooling is desired, the valve 106 directs the flow of ammonia through the condenser 108 and the system 100 functions as an absorption cycle, as described above in connection with FIG. 2. If heating is desired, the valve 106 directs the flow of ammonia through a secondary circuit bypassing the condenser 108 and spray orifice 112, which eliminates the cooling portion of the system 100 and sends hot ammonia to the evaporator 114, as described above in connection with FIG. 3. In one example, the controller 128 generates a decision as to which mode is appropriate, for example by receiving signals generated by manual inputs coupled to inputs of the controller 128 such as a button actuated by a user. In another example, the controller 128 generates a decision as to which mode is appropriate by automatically sensing the temperature, for example by receiving signals from an electrical temperature transducer coupled to an input of the controller 128 that may reside in the cab and/or outside of the vehicle. The controller 128 may read a signal generated by the temperature transducer coupled to an input and anticipate the proper action to maintain user comfort based on control logic stored in the controller 128 and the controller 128 may generate an output signal for the valve 106 causing the valve 106 to move to the desired position to place the system 100 in either cold storage mode or heat storage mode.

The controller 128 may further be electrically coupled to any of the pumps (for example, pumps 128*a*, 128*b*, and/or 128*c*) shown in FIG. 1. For example, the controller 128 may be electrically coupled to the pump 128*c*, which may be an ammonia/water solution pump responsible for creating the return flow of the water/ammonia solution from the absorber 116 to the generator 104 in the final stages of the processes 200 or 300 described in connection with FIGS. 2 and 3. As indicated at block 408, the controller 128 controls the pumps used to maintain the functioning of the system 100. In one example, the controller 128 may control whether the pumps are on or off and at what speed the pumps are operating. In one example, the controller 128 controls operation of the pump, for example by generating an appropriate output signal to control a relay coupled to the pump 128*c*, to maintain the suitable liquid level in both pressure vessels (e.g., the absorber 116 and the generator 104) by gathering information from a variety of sensors or transducers that provide signals indicating, for example, fluid flow at various stages of the system 100, temperature in various sections of the system 100, pressure at various sections of the system 100, and/or liquid level indicators at various sections of the system 100. The controller 128 may use one or more of these inputs to compare the readings the controller 128 obtains from the sensors or transducers against specific targets programmed in the control logic of the controller 128 and generate an appropriate output signal to control the pump 128*c* to satisfy the output conditions dictated by the control logic.

The controller 128 may further be electrically coupled to the pump 128*a* and/or the pump 128*b*, which may be responsible for circulating the solution (e.g., water/glycol) between two or more heat exchangers in order to transfer thermal energy from one component to the next in the system 100. In one example, the controller 128 monitors the signals indicating temperatures supplied by temperature transducers coupled to heat exchangers (e.g., the evaporator 114 and/or the thermal storage tank fluid passages 122, 124) and determines through program logic stored in the controller 128 if the transfer of thermal energy is appropriate in order to meet the end thermal objectives of the system 100 by comparing the temperatures indicated by the temperature transducers against targets stored in the code. The controller 128 then operates the pumps accordingly.

The controller 128 may further be electrically coupled to a number of cooling fans (not shown). Any of the components of the system 100 incorporating a heat exchanger may optionally include a cooling fan, for example the condenser 108. A fan that blows air through the condenser 108 may be responsible for allowing such a liquid to air heat exchanger to function more efficiently and to reject the proper heat load to surrounding environment cooling the fluid media within (e.g., the ammonia, in the case of the condenser 108). As indicated by block 410, the controller 128 controls any cooling fans installed in the system 100 based on the relevant input signals received by the controller 128. In one example, the controller 128 may control operation of the fan to maintain the desired cooling effect on the heat exchanger, such as the condenser 108, by monitoring input signals generated by temperature transducers and comparing these inputs to targets encoded in the control logic of the controller 128. Fan operation may be adjusted accordingly. For example, the fan may either be turned completely on or off and, when on, the speed of the fan may be set accordingly. In one example, a fan coupled to the condenser 108 may operate when the system 100 is in cold storage mode, but not when the system 100 is in heat storage mode since the condenser 108 is not used in heat storage mode. Further, in one example, the speed of the fan may be suitably controlled by the controller 128 to achieve the desired cooling rate of fluid passing through the heat exchanger.

The controller 128 may further be coupled to valve 130 that controls the flow of solution flowing through the thermal tank output fluid passage 124. As indicated by block 412, the controller 128 controls the position of the valve 130 based on relevant inputs, which controls use of the energy stored in the thermal storage tank 122. The valve 130 may be a 3-way 3-position dual circuit type and may direct the flow of the solution (e.g., glycol/water) between the vehicle's HVAC 126, the vehicle's engine, and thermal storage tank 120. In one example, the controller 128 decides which flow path is appropriate by receiving input signals, for example generated by manual inputs of a user using a button, which indicates the desired operating mode of the system 100. The controller may further receive inputs from temperature transducers indicating the temperatures in any of the previously mentioned components and the controller 128 may then decide the most appropriate action to achieve the goal of the system 100 and send the appropriate output signal to the valve 130. As previously discussed in the exemplary context of the system 100 operating in heat storage mode, the valve 130 may have three possible positions. The valve 130 may be closed, for example when the vehicle is moving and the heat source from the thermal storage tank is currently not needed while the system 100 is heating the solution in the thermal storage tank 120 to store thermal energy for later use and therefore restoring conventional heating input from the engine to the HVAC 126. Second, the valve may be in a first open position allowing the solution to pass to the HVAC unit 126, thereby allowing the HVAC 126 to use the stored heat such as when the vehicle is parked with the engine off and a user of the system 100 desires the cabin of the vehicle to be heated. Third, the valve may be in a second open position directing the flow of solution to the vehicle engine. This may be useful during a cold start of the engine during cold conditions, allowing the user of the system 100 to pre-heat the engine before starting the engine, thereby reducing emissions emitted by the engine during a cold start and allowing the user to immediately use the vehicle heating system once the engine is started.

The controller 128 may further be coupled to one or more charge controllers providing an electrical charge control function. The charge controller is responsible for but not limited to regulating the flow of electricity in and out of the batteries of the system 100 (not shown) contained within a number of optional components of the system 100, such as an energy storage system, a plug-in battery charger, a photovoltaic array, and/or the bus of the vehicle or vehicle components. In one example, the controller 128 monitors the voltage coming in and out of the system 100 and regulates the flow of electricity while taking into account many different parameters for example, time of day, battery state of charge (SOC), vehicle operation, and the amount of power available to capture. The controller 128 receives signals indicating some or all of this information and decides a course of action for the charge controller based on the program logic programmed into the controller 128. As indicated at block 414, the controller 128 controls one or more charge controllers (not shown) based on relevant inputs.

While the process or method 400 is shown as occurring in a particular order, any of the blocks 402, 404, 406, 408, 410, 412, and 414 may be rearranged as the order of the blocks is not critical to the functioning of the system 100. Further, it will be understood by those skilled in the relevant arts that the method 400 when executed by the controller 128 is cyclical and/or iterative, and the controller 128 typically executes the process 400 several times per second. Further, the functions illustrated by the blocks 402, 404, 406, 408, 410, 412, and 414 are intended to be exemplary and one or more of the blocks may be optional, depending on the design criteria of a particular application. Further yet, the method 400 is intended to illustrate some of the major control aspects of the system 100. It will be understood by those skilled in the relevant arts that the controller 128 performs more functions than what is illustrated by the method 400.

Figure 5:
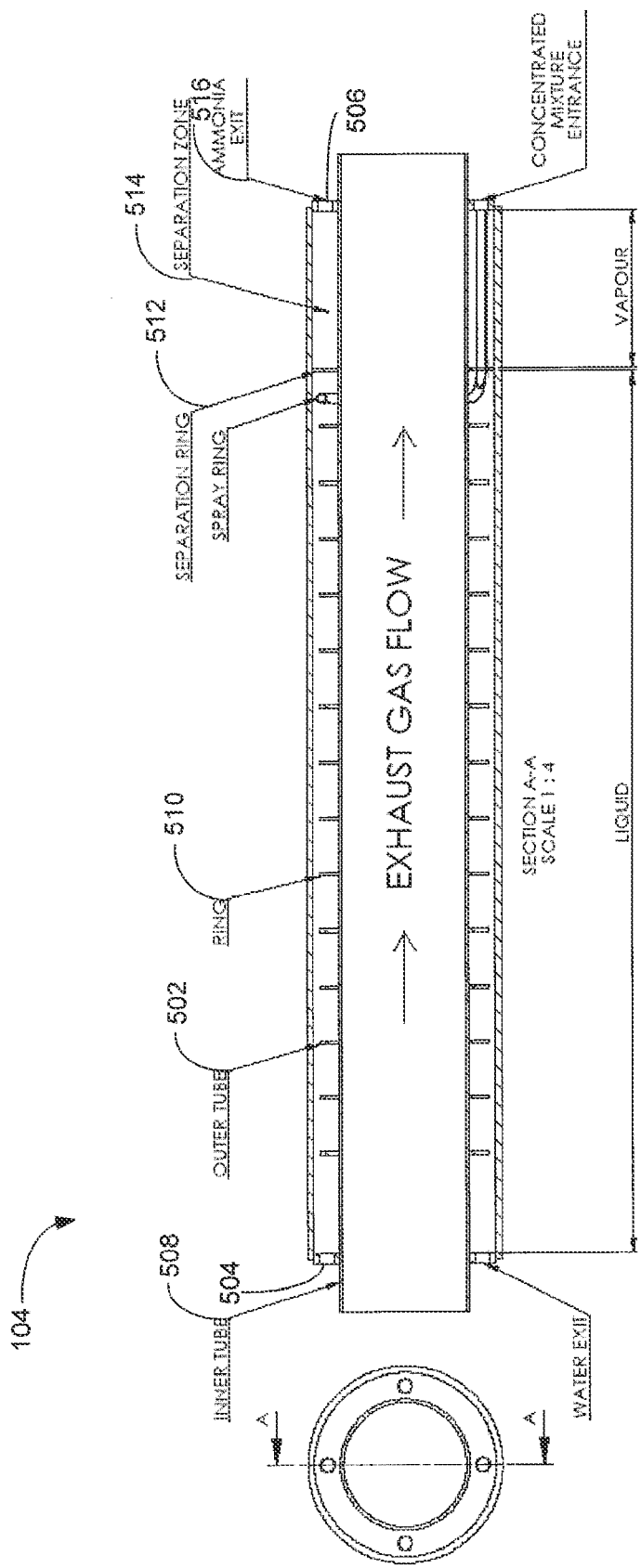
FIG. 5 shows a front view and a related sectional view of a generator for use with a thermal auxiliary power unit according to one aspect of the present description.

Reference is next made to FIG. 5, which shows a bottom view and a corresponding sectional view of the generator 104 for use with a thermal auxiliary power unit according to one aspect of the present description. FIG. 5 illustrates one example of the generator 104 that may be suitable for use with the system 100 and is not intended to be limiting. Any generator may be used according to the design criteria of a particular application. The generator 104 generally comprises an outer tube or shell 502, end plates 504, 506, an inner tube 508, an exhaust gas passage 509, annular rings 510, a separation ring 512, a separation zone 514, and an ammonia exit line 516.

The outer shell 502 portion of the generator 104 contains the pressurized and heated fluid, for example the ammonia and water solution. In one example, the solution may have a concentration that varies from a few percent of ammonia by weight to as high as 20% ammonia by weight. In one example, the generator 104 is designed as a pressure vessel to appropriate codes in the jurisdiction where the generator is used. Internal pressure of the generator 104 may rise to 250 psig while operating from 50 psig in a quiescent state. The temperature range of the generator may vary from −40 degrees Celsius while inoperative to 130 degrees Celsius or more internally during normal operation. During an overheat condition, the outer shell 502 may reach up to 250 degrees Celsius. The pressure vessel boundary includes the outer tube 502 as shown in FIG. 5 and two endplates 504, 506 which are formed such that the end plates 504, 506 act as closures between the outer tube 502 and the concentric inner tube 508. The outer shell 502 may be fabricated from carbon steel such as seamless tubing, having properties appropriate for the conditions and composition of the contained fluids such as, but not limited to, ASTM A516, and in some applications a grade of stainless steel such as SS304 may be used.

The inner tube 508 may form part of the exhaust gas passage 509 from the engine to the atmosphere. The function of the inner tube may be to provide a passage for the hot exhaust gases that provide the energy harvested by the system 100 and also withstand on the outside of the inner tube 508 the high pressures generated by the pressurised working fluid (e.g., the solution) in the absorption circuit. The inner tube 508 may conduct heat from the flowing exhaust gases into the solution with the aid of the annular rings 510, described below. In one example, the inner tube 508 may be manufactured from carbon steel such as seamless tubing and may have properties appropriate for the conditions and composition of the contained fluids such as, but not limited to, ASTM A516, and in some applications a grade of stainless steel such as SS304 may be used.

These annular rings 510 surround the inner tube 508 and serve to increase the amount of heat conducted from the hot exhaust gas flowing through the inner tube 508 into the solution flowing through the outer tube 502 by increasing the amount of surface area available for heat transfer and helping to raise the temperature and pressure of the solution therefore increasing the effectiveness of the generator 104 and its ability to better vaporize the solute from the solution. In one example, the rings 510 have a tight fit to the inner tube 508, but have a radial clearance relative to the outer tube 502 enabling fractionation of the solution while stabilizing the fluid column against violent bubbling and sloshing as the vehicle moves. The rings 510 may be fabricated of a material compatible with the inner tube 508 and the outer tube 502. In one example, all the metallic components of the generator 104 may be made from the same materials for ease of fabrication.

The separation ring 512 works to separate the lower space (e.g., to the left of the separation ring 512 as shown in FIG. 5) which is a fluid heating and boiling zone whereby a wet gas (e.g., ammonia) with some entrained water from the separation zone is driven from the solution (e.g., water and ammonia) and an upper space (e.g., to the right of the separation ring 512 as shown in FIG. 5) where fluid droplets are largely removed leaving a mostly dry gas (e.g., ammonia) to leave the vessel. In one example, the ring 512 may have a tight fit with both the inner tube 508 and the outer tube 502 and may be welded to the inner tube 508 for ease of assembly. The ring 512 may be fabricated from materials compatible with the tubes 502 and 508 as previously described. The ring 512 may include an annular plate penetrated by a series of holes which may be, in one example, approximately 25% in diameter of the annular gap. The open area of the plate created by the holes may be, but is not limited to, 10 to 20% of the total annular area.

The separation zone 514 includes a volume. In one example, the volume may be packed with a droplet coalescence material such as stainless steel wool or other like material which provides a very high surface area. Droplets of solute (e.g., liquid water) form on these surfaces and drain back to the liquid space below the separation ring 512. The gas (e.g., vaporized ammonia) that exits the vessel through the ammonia exit line 516 at the top is nearly all ammonia gas (e.g., as much as 99% ammonia gas with very little water vapour, for example 1% water vapour).

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A controller for a heat capture and storage system configured to capture and store energy from heat expelled in engine exhaust, the controller comprising a plurality of inputs, a plurality of outputs, and at least one processor coupled to a memory for storing within the memory instructions executable by the at least one processor, the controller configured by execution of the instructions stored in the memory to:
receive signals at one or more of the plurality of inputs, the signals representing at least one operating parameter of the heat capture and storage system; and
based on at least one operating parameter, generate signals at one or more of the plurality of outputs for controlling at least one component of the heat capture and storage system to capture and store the energy from the heat expelled in the engine exhaust; wherein the controller is coupled, by way of at least one of the signals at one or more of the plurality of outputs, to one or more pumps configured to circulate a solution carrying thermal energy through the heat capture and storage system, and the controller is configured to control a speed of the one or more pumps.

2. The controller of claim 1, wherein the controller is coupled, by way of at least one of the signals at one or more of the plurality of outputs, to an operating mode control valve included in the heat capture and storage system, and the controller is configured to switch the heat capture and storage system between a heat storage mode and a cold storage mode by controlling a flow path through the operating mode control valve.

3. The controller of claim 2, wherein the signals received at the one or more of the plurality of inputs include a signal indicating a temperature, and the controller is configured to switch the heat capture and storage system between the heat storage mode and the cold storage mode in response to that signal.

4. The controller of claim 1, wherein the at least one component controlled by the controller comprises at least one of an exhaust diverter valve, an operating mode control valve, a fluid pump, a cooling fan, or a charge controller.

5. The controller of claim 1, wherein the controller is coupled, by way of at least one of the signals at one or more of the plurality of outputs, to an exhaust diverter valve included in the heat capture and storage system, and the controller is configured to control the exhaust diverter valve to divert at least a part of the engine exhaust away from a generator of the heat capture and storage system.

6. The controller of claim 5, wherein the signals received at the one or more of the plurality of inputs include a signal indicating at least one of a temperature and a pressure in the heat capture and storage system, and the controller is configured to control the exhaust diverter valve in response to that signal.

7. The controller of claim 5, wherein the controller is configured to detect a fault condition of the heat capture and storage system based on the signal indicating at least one of a temperature and a pressure in the heat capture and storage system.

8. The controller of claim 7, wherein the controller is configured to control the exhaust diverter valve to divert substantially all the engine exhaust away from the generator in response to detecting the fault condition.

9. The controller of claim 1, wherein the signals received at the one or more of the plurality of inputs include a signal indicating a temperature, and the controller is configured to control the speed of the pump to meet a specified temperature.

10. The controller of claim 1, wherein the signals received at the one or more of the plurality of inputs include a signal indicating a pressure, and the controller is configured to control the speed of the one or more pumps to meet a specified pressure.

11. The controller of claim 1, wherein the signals received at the one or more of the plurality of inputs include a signal indicating a liquid level in the heat capture and storage system, and the controller is configured to control the speed of the pump to meet a specified liquid level.

12. The controller of claim 1, wherein the controller is coupled, by way of at least one of the signals at one or more of the plurality of outputs, to a fan included in the heat capture and storage system, and the controller is configured to control a speed of the fan to control a cooling rate of solution carrying thermal energy in the heat capture and storage system.

13. The controller of claim 12, wherein the signals received at the one or more of the plurality of inputs include a signal indicating a temperature, and the controller is configured to control the speed of the fan to meet a specified temperature.

14. The controller of claim 12, wherein the signals received at the one or more of the plurality of inputs include a signal indicating a pressure, and the controller is configured to control the speed of the fan to meet a specified pressure.

15. The controller of claim 1, wherein the controller is coupled, by way of at least one of the signals at one or more of the plurality of outputs, to a first pump configured to circulate a first solution through a first heat exchanger to extract thermal energy from said engine exhaust and the controller is configured to control the first pump.

16. The controller of claim 15, wherein the controller is coupled, by way of at least one of the signals at one or more of the plurality of outputs, to a second pump configured to circulate a second solution through a second heat exchanger to transfer thermal energy from to the second solution, and the controller is configured to control the second pump.

17. The method of claim 16, wherein the control signals include a signal for controlling a second pump configured to circulate a second solution through a second heat exchanger to transfer thermal energy from to the second solution, and the controller is configured to control the second pump.

18. A processor-implemented method of controlling a heat capture and storage system configured to capture and store energy from heat expelled in engine exhaust, the method comprising:
receive, at at least one processor, operating signals representing at least one operating parameter of the heat capture and storage system; and
generating, at the at least one processor, control signals for controlling at least one component of the heat capture and storage system based on the at least operating parameter, wherein the control signals include a signal for controlling a pump configured to circulate a solution carrying thermal energy through the heat capture and storage system.

19. The method of claim 18, wherein the control signals include a signal for controlling an operating mode control valve included in the heat capture and storage system to cause the heat capture and storage system to switch between a heat storage mode and a cold storage mode.

20. The method of claim 18, wherein the control signals include a signal for controlling an exhaust diverter valve included in the heat capture and storage system to divert at least a part of the engine exhaust away from a generator of the heat capture and storage system.

21. The method of claim 18, wherein controlling the pump includes controlling a speed of the pump to meet a specified temperature.

22. The method of claim 18, wherein controlling the pump includes controlling a speed of the pump to meet a specified pressure.

23. The method of claim 18, wherein controlling the pump includes controlling a speed of the pump to meet a specified liquid level in the heat capture and storage system.

24. The method of claim 18, wherein the control signals include a signal for controlling a fan included in the heat capture and storage system to control a cooling rate of solution carrying thermal energy in the heat capture and storage system.

25. The method of claim 18, wherein the control signals include a signal for controlling a first pump configured to circulate a first solution through a first heat exchanger to extract thermal energy from said engine exhaust.

* * * * *